M. LEITCH.
SHOCK ABSORBING WORM SCREW SPINDLE.
APPLICATION FILED AUG. 12, 1919.
1,364,120.
Patented Jan. 4, 1921.
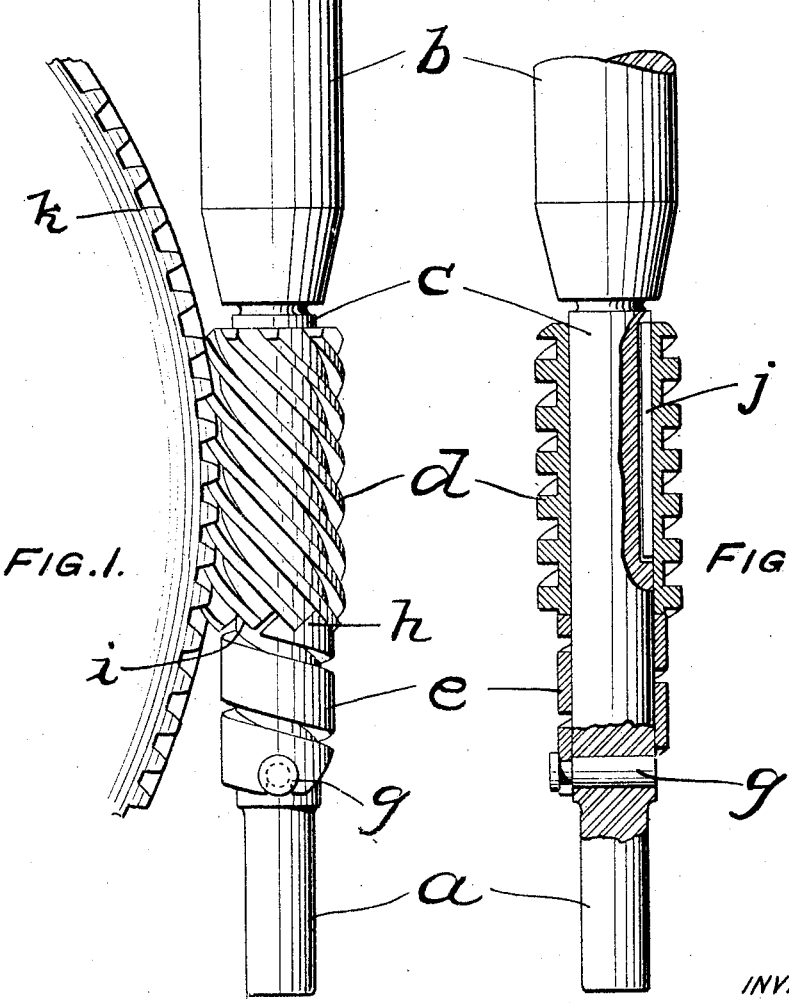
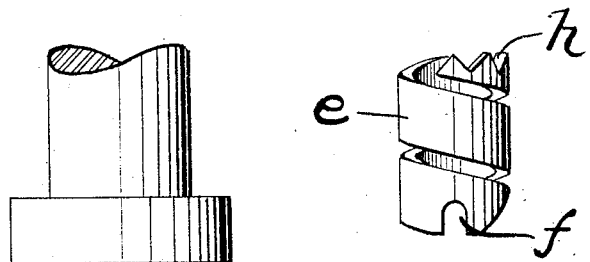
INVENTOR
Meredith Leitch
BY
Frank S. Busser
ATTORNEY.

UNITED STATES PATENT OFFICE.

MEREDITH LEITCH, OF POUGHKEEPSIE, NEW YORK, ASSIGNOR TO THE DE LAVAL SEPARATOR COMPANY, OF NEW YORK, N. Y., A CORPORATION OF NEW JERSEY.

SHOCK-ABSORBING WORM-SCREW SPINDLE.

1,364,120.   Specification of Letters Patent.   Patented Jan. 4, 1921.

Application filed August 12, 1919. Serial No. 316,931.

*To all whom it may concern:*

Be it known that I, MEREDITH LEITCH, a citizen of the United States, residing at Poughkeepsie, county of Dutchess, and State of New York, have invented new and useful Improvements in Shock-Absorbing Worm-Screw Spindles, of which the following is a full, clear, and exact description, reference being had to the accompanying drawings, which form a part of this specification.

My invention is an improvement in worm screw spindles for centrifugal machines.

In many of these machines the bowl is mounted on the top of a vertical spindle having a worm spindle near its lower end and driven by a worm wheel revolving about a horizontal axis. Very slight inaccuracies in the pitch or the shape of the teeth on either worm or wheel will, when the worm is integral with the spindle, set up vibrations which produce a very disagreeable noise, create a disagreeable feeling at the handle of hand-driven machines, and also cause rapid wear.

I am aware that it is old to provide a spindle with a sleeve worm and to interpose between the sleeve worm and the spindle a member through which motion is transmitted from the driving worm wheel to the spindle. Thus, in one construction of the prior art, a spring cushion of round wire surrounds the spindle and is interposed between the sleeve worm and the spindle. While this expedient is of decided advantage, the actual construction is open to serious objections. Thus the periphery of the driving wheel is necessarily far enough distant from the spindle to permit the spring and its appurtenances to freely pass the tops of the teeth. This requires that the root diameter of the worm shall be as great as the outside diameter of the spring. A spring of round wire of adequate strength must be of substantial diameter. Hence the worm or pinion must be of large diameter, and therefore either an excessively large driving worm wheel or gear must be used or the driving ratio between the worm wheel and worm must be reduced substantially below what is desirable or necessary. In the same construction, the worm is loose on the spindle, and when the driving wheel stops, its ratchet tooth will rattle and bump over the end of the spring, making a disagreeable noise until the bowl comes to rest.

In another construction of the prior art, a toothed clutch member surrounding the spindle is interposed between the driven worm and spindle. In this construction, the toothed clutch member is of sufficiently small diameter to permit of the use of a small diameter worm or spindle and a light spring is interposed between the spindle and the worm wheel for the purpose of maintaining contact between the worm and spindle in the lengthwise movement of the worm. While the second construction lacks advantages possessed by the first, it has certain advantages. It is not open to the objection of requiring the use of a driven worm or pinion of large diameter. Again, when the application of power ceases and the spindle, because of the momentum of the bowl driven by it, continues to revolve, the light spring maintains its frictional engagement with the worm, tending to cause the worm to climb the spindle and be held out of contact with the clutch until forced downward by rotation of the worm wheel. During this downward movement, however, the worm wheel will generally begin to revolve so that the clutch teeth will finally engage with a considerable shock.

Both constructions are also open to other objections. Thus, the means for securing to the spindle the device (either a spring and ring, or a toothed clutch) which transmits motion from the sleeve worm or pinion to the spindle is a tightly driven pin whose ends are rivet-headed with a hammer. In the driving of the pin and the upsetting of the ends, the spindle is apt to be sprung out of true and cause rough running.

The object of my invention is to provide a centrifugal machine which will have the advantages of both of the prior art constructions above referred to without the disadvantages of either and will possess advantages of its own. In short, the object of the invention is to provide a centrifugal machine which, besides having a quiet and smooth drive and a small diameter worm or piston, will be quiet while the machine is coming to rest, will start without jar, and can be applied without danger of springing the spindle, which may still be removed from the machine as a unit.

I accomplish my objects by a construction of which a preferred form is shown in the accompanying drawings, in which:—

Figure 1 is an elevational view of a spindle, with the worm, spring, etc., in place.

Fig. 2 is a view, partly in section, at right angles to Fig. 1.

Fig. 3 is a separate view of the spring.

The spindle proper has a small-diameter lower end $a$, a larger-diameter upper portion $b$, and between them an intermediate-diameter portion $c$. The sleeve worm $d$ and the spring $e$, wound from a flat ribbon, fit around the intermediate-diameter portion $c$. The lower end of the spring is provided with a notch $f$ which fits around the neck of a pin $g$ fitting snugly, but freely, in a hole through the spindle. The upper end of the spring is provided with ratchet teeth $h$ and the lower end of the worm with mating teeth $i$. A wire or bar $j$ of non-resilient metal lies loosely in a groove cut in the part of the spindle surrounded by the worm. $k$ is a part of a wheel for driving the worm.

The construction illustrated has all the resiliency of the known construction. The spring $e$ being of a wide flat ribbon, it can be made strong without excessive thickness and so permit it to be easily passed upward by a worm wheel that fits a worm of small diameter. The driving pin $g$ fits so loosely in its hole in the spindle that it can be pushed into place with one finger, so there is no danger of bending the spindle while driving it in. When the notch $f$ is in place around the neck of the pin, it is impossible for the pin to be displaced.

When the application of power ceases, the wheel $k$ immediately stops, but the spindle, because of the momentum of the bowl driven by it, continues to revolve. The ratchet teeth $i$ on the worm will be thrown up above the ratchet teeth $h$ of the spring until the top of the worm strikes the shoulder on the spindle. The weight of the worm tends to cause a return to a point where its teeth will be rapidly struck by the tops of those on the spring. Centrifugal force, however, throws the soft wire $j$ outward against the inside of the sleeve, causing enough friction to keep the worm turned forward and tending to climb the worm wheel and so hold it against the shoulder on the spindle and with its teeth clear of the spring. The advantage of the non-resilient member $j$ over the light spring of the prior art is that the pressure required to cause friction between the sleeve worm and the spindle depends entirely on centrifugal force. This friction, therefore, ceases as soon as the machine comes to rest, and the worm sleeve falls until its ratchet teeth are in contact with those of the spring. The spring is therefore in position for immediate action as soon as power is applied to the worm wheel and hammer blows on the ratchet teeth when they engage are obviated.

While I herein use the words "worm" and "wheel," I intend them to include any form of gear in which the driven member has helical teeth.

Having now fully described my invention, what I claim and desire to protect by Letters Patent is:

1. In a gearing for a centrifugal machine, the combination with a driving worm wheel and a spindle body provided with a cavity and with a hole, of a sleeve worm surrounding part of the body and having a ratchet tooth on its lower end, a centrifugal weight in said cavity, a ribbon spring around the body below the worm and having its upper end cut off to form a mating ratchet tooth, and a pin fitting freely in said hole and having a neck with which the spring engages.

2. In a gearing for a centrifugal machine, the combination with a driving member, of a driven member comprising a spindle body, a sleeve worm with a ratchet tooth and a spring with a mating ratchet tooth, and means including a centrifugally engageable friction member adapted to cause the worm, in case the driven member overruns the driving member, to climb the teeth of the driving member so that the ratchet teeth are kept disengaged and adapted to be rendered inoperative to uphold the worm upon the cessation of rotation of the driven member.

3. In a bowl spindle for a centrifugal machine, in combination, a spindle body, a sleeve worm, a resilient connection between the worm and the spindle body, and means, including a centrifugally operable non-resilient friction member, to cause the worm to tend to rotate with the body when the ratchet is disengaged.

4. In a bowl spindle for a centrifugal machine, in combination, a spindle body, a sleeve worm and a spring having coacting ratchet teeth, and means, including a notch in the spring and a necked pin freely fitting a hole in the body, to connect the spring to the body.

In testimony of which invention, I have hereunto set my hand, at Poughkeepsie, N. Y., on this 7th day of August, 1919.

MEREDITH LEITCH.